UNITED STATES PATENT OFFICE.

BERT A. STAGNER, OF PITTSBURGH, PENNSYLVANIA, ASSIGNOR, BY MESNE ASSIGNMENTS, TO NATIONAL RETARDER COMPANY, OF CHICAGO, ILLINOIS, A CORPORATION OF OHIO.

GROWING OF YEAST.

1,425,065.     Specification of Letters Patent.    Patented Aug. 8, 1922.

No Drawing. Application filed July 6, 1916, Serial No. 243,730. Renewed August 30, 1921. Serial No. 497,046.

*To all whom it may concern:*

Be it known that I, BERT A. STAGNER, a citizen of the United States, residing at Pittsburgh, in the county of Allegheny, State of Pennsylvania, have invented certain new and useful Improvements in the Growing of Yeast; and I do hereby declare the following to be a full, clear, and exact description of the invention, such as will enable others skilled in that art to which it appertains to make and use the same.

This invention relates to improvements in the growing of bakers' yeast of good color, odor and keeping qualities, and having good baking strength when used in the manufacture of leavened bread.

In the growing or propagation of bakers' yeast, a considerable amount of nitrogenous food material is essential in order that the yeast may multiply and increase in amount to the desired extent. At the present time, malt sprouts are almost universally employed as the nitrogenous food material in growing bakers' yeast, because of their content of available nitrogenous substances.

I have discovered that yeast of good color, odor and keeping qualities and having good baking strength when used in the manufacture of leavened bread, can be successfully and advantageously grown with the aid of nitrogenous food material resulting from the hydrolysis of keratin or keratin containing materials. The present invention accordingly involves, in the growing of yeast, the association with the yeast and carbohydrate material of the products of hydrolysis of keratin and keratin containing materials.

Keratin is a constituent of skins, hides, horns, nails, hair, wool, feathers, etc. When treated with acids, alkalis or superheated water, such keratin containing materials undergo hydrolysis and yield a variety of water soluble products of hydrolysis.

The following example of the hydrolysis of a keratin-containing material will illustrate, in general, the procedure to be followed in obtaining the product contemplated by the present invention as a nitrogenous food material for the growing of yeast. Two kilograms of animal hair (say, the hair of cattle) are heated with fourteen kilograms of water in a closed autoclave for a period of from twenty to twenty-four hours and at a temperature of about 150° C. The hair goes into solution almost completely. The resulting solution is filtered, and the filtrate evaporated to dryness. The product obtained on evaporation is the hydrolysis product of keratin and is a resinous, brittle material which can be readily pulverized and is completely soluble in water.

The dried hydrolysis product, obtained, for example, by the procedure described in the preceding paragraph, contains about 14.7 per cent of nitrogen. This nitrogen content is in a form readily available for the growing of the yeast. Thus, when added to the proper carbohydrates, or carbohydrate-containing substances, the product provides in whole or in part, the necessary nitrogenous food material for the growth or for the fermentation processes of yeast. For this purpose, the product may be used in the form of the filtered solution obtained directly after the completion of the hydrolysis, or the dried product, after evaporation, may be redissolved in water.

The following examples will serve to illustrate the proportions in which the various constituents entering into the growth of the yeast, in accordance with the present invention, may be employed to advantage.

(1) Three grams of the dried hydrolysis product of keratin or keratin containing material are added to two hundred cubic centimeters of water and twenty grams of cane sugar, to which is added three grams of the seed yeast. Such a mixture, maintained at a temperature of 30° C. will evolve carbon dioxide by fermentation practically three times as rapidly as in the case of such a mixture in which the keratin hydrolysis product is omitted.

(2) A typical mash is made up, in the following way, to contain the amount of nitrogenous material generally used for growing bakers' yeast; viz, 14.5 grams of the dried hydrolysis product of keratin, 120 grams of malt sprouts, 370 grams of corn, 230 grams of barley and 160 grams of rye. 5 grams of yeast are then added to 2 litres of water extract from the mash, and fermentation is proceeded with for the normal period of time.

The resulting yeast is of good color, odor and keeping qualities and is comparable with bakers' yeasts obtained with the use of malt sprouts as the source of nitrogenous material. The yeast has good baking strength and is well adapted for use in the manufacture of leavened bread.

It will be understood that the keratin hydrolysis product is not of itself sufficient for the growing of yeast, for the reason that it does not contain the necessary carbohydrate content. Accordingly, as above indicated, a carbohydrate of some suitable kind must be provided, as for instance, sugar, as above noted, or preferably the filtered wort obtained from the usual mash product from corn, rye, barley, or other grains.

The products of hydrolysis of the keratin or keratin containing materials have the advantage that they can be produced by a simple and inexpensive operation, and the further advantage that their use in yeast manufacture enables a material saving in grain to be obtained while still obtaining a satisfactory and merchantable yeast available for use as a bakers' yeast or as a compressed yeast or for yeast foam, etc.

As previously mentioned, it has heretofore been the general practice, in growing bakers' yeast, to employ malt sprouts for furnishing the nitrogenous food material. The present invention by providing a nitrogenous food material available for use in the production of satisfactory bakers' yeast thus enables a material saving in the amount of sprouts and grain which has heretofore been considered necessary for satisfactory yeast growth.

What I claim is:

1. The method of growing bakers' yeast of good color, odor and keeping qualities, and having good baking strength in the manufacture of leavened bread, which comprises supplying to the seed yeast suitable carbohydrate material and the products of hydrolysis of keratin or keratin-containing materials as nitrogenous material for the growth of the yeast, the amount and character of such products of hydrolysis being sufficient to enable rapid growth and increase of the yeast; substantially as described.

2. The method of growing bakers' yeast of good color, odor and keeping qualities, and having good baking strength in the manufacture of leavened bread, which comprises adding seed yeast to a wort made from corn, rye and barley, and adding products of hydrolysis of keratin or keratin-containing materials as the nitrogenous material for the growth of the yeast, substantially as described.

3. In the growing of bakers' yeast of good color, odor and keeping qualities, and having good baking strength in the manufacture of leavened bread the step which comprises supplying to the yeast, along with the carbohydrate material, products of hydrolysis of keratin or keratin containing materials in amounts sufficient for the rapid propagation and increase of the yeast.

In testimony whereof I affix my signature.

BERT A. STAGNER.